United States Patent
Veldman et al.

(10) Patent No.: US 7,479,087 B2
(45) Date of Patent: Jan. 20, 2009

(54) PINION SHAFT AND DIFFERENTIAL HOUSING ASSEMBLY

(75) Inventors: Robert Veldman, Brighton, MI (US); Jeffrey L. Lubben, Pinckney, MI (US)

(73) Assignee: Metaldyne Company LLC, Plymouth, MI (US)

( * ) Notice: Subject to any disclaimer, the term of this patent is extended or adjusted under 35 U.S.C. 154(b) by 0 days.

(21) Appl. No.: 11/732,183

(22) Filed: Apr. 3, 2007

(65) Prior Publication Data

US 2007/0249458 A1    Oct. 25, 2007

Related U.S. Application Data

(60) Provisional application No. 60/788,774, filed on Apr. 3, 2006.

(51) Int. Cl.
*F16H 48/06* (2006.01)
(52) U.S. Cl. ...................................... 475/230
(58) Field of Classification Search ........................ None
See application file for complete search history.

(56) References Cited

U.S. PATENT DOCUMENTS

| | | | |
|---|---|---|---|
| 1,226,854 A | 5/1917 | Bower | |
| 1,308,614 A | 7/1919 | Baldock | |
| 2,720,797 A | 10/1955 | Huddleston et al. | |
| 3,310,999 A | 3/1967 | Griffith | |
| 3,651,713 A | 3/1972 | Mueller | |
| 3,955,443 A | 5/1976 | Estrada | |
| 4,363,248 A | 12/1982 | Brisabois | |
| 4,722,244 A | 2/1988 | Tsuchiya et al. | |
| 4,848,183 A | 7/1989 | Ferguson | |
| 4,901,599 A | 2/1990 | Irwin | |
| 4,959,043 A | 9/1990 | Klotz et al. | |
| 5,718,653 A | 2/1998 | Showalter | |
| 6,045,479 A | 4/2000 | Victoria et al. | |
| 6,061,907 A | 5/2000 | Victoria et al. | |
| 6,254,505 B1 | 7/2001 | Forrest | |
| 6,592,487 B2 * | 7/2003 | Gassmann | 475/223 |
| 6,945,898 B2 | 9/2005 | Szuba | |
| 7,025,702 B2 | 4/2006 | Saito et al. | |

(Continued)

FOREIGN PATENT DOCUMENTS

WO    WO2007/111915    10/2007

(Continued)

OTHER PUBLICATIONS

International Search Rpt., filed May 30, 2008, Metaldyne Company LLC.

*Primary Examiner*—Dirk Wright
(74) *Attorney, Agent, or Firm*—Robert H. Earp, III; McDonald Hopkins LLC

(57) ABSTRACT

The present invention provides a differential housing assembly having a pinion shaft positioned therein. The differential housing assembly is capable of imparting torque to at least a pair of axle shafts of, for example a vehicle. The pinion shaft has a relief portion for receiving a portion of at least one of the axle shafts. The relief portion is capable of compensating for offset between the centerline of the pinion shaft and a centerline of a vehicle. In an exemplary embodiment, the relief portion allows the axle shafts to have equal lengths.

20 Claims, 3 Drawing Sheets

U.S. PATENT DOCUMENTS

| | | |
|---|---|---|
| 7,155,997 B2 | 1/2007 | Santelli |
| 2004/0116235 A1 | 6/2004 | Szuba |
| 2007/0225103 A1 | 9/2007 | Veldman et al. |
| 2007/0249458 A1 | 10/2007 | Veldman et al. |

FOREIGN PATENT DOCUMENTS

| | | |
|---|---|---|
| WO | WO2007/120470 | 10/2007 |

\* cited by examiner

US 7,479,087 B2

PINION SHAFT AND DIFFERENTIAL HOUSING ASSEMBLY

CROSS-REFERENCE TO RELATED APPLICATION

This application claims priority from U.S. Provisional Patent Application No. 60/788,774 entitled "NARROW DIFFERENTIAL HOUSING" filed on Apr. 3, 2006, which is hereby incorporated by reference in its entirety.

FIELD OF THE INVENTION

The present invention is generally related to mechanical differentials, and more particularly to an improved pinion shaft and differential housing assembly.

BACKGROUND

Differentials are known in the automotive industry as devices that split engine torque two ways, allowing each output to spin at a different speed. Generally, differentials have three primary tasks: to aim the engine power at the wheels; to act as the final gear reduction in the vehicle, slowing the rotational speed of the transmission one final time before transmission to the wheels; and to transmit the power to the wheels while allowing them to rotate at different speeds.

In a typical vehicle application, the rotating driveshaft of the vehicle engages a ring gear, which is mounted onto the differential housing. Thus, the driveshaft drives the ring gear, which in turn rotates the differential housing. A typical mechanical differential contains a housing (or carrier), two side gears, and several pinion gears. Pinion shafts attach the pinion gears to the housing so that, as the housing rotates, the pinion gears are driven. The pinion gears drive the two side gears, which in turn drive the axle (or half shafts) attached thereto.

Referring now to FIGS. 1-3, a known differential assembly 1 is shown. A differential housing 2 having holes 20 for receiving a pinion shaft 22a. Specifically, each pinion shaft 22a is inserted into the holes 20. The pinion shaft 22a is secured to the housing 2 via one or more locking pins 25 extending through the pinion shaft 22a and into the housing 2. The locking pins 25 secure the pinion shaft 22a so that the pinion gears 8 meshingly engage side gears 19. The locking pins are typically required to lock the pinion shaft to the housing so as to prevent movement of the pinion shaft with respect to the differential housing. The use of locking pins in this manner requires holes to be bored into the housing and pinion shafts, and can increase the time and costs associated with manufacturing and assembling the differentials. Significant machining and complex assembly is needed for such known locking differentials.

Extending from each side gear 19 is an axle shaft 40 of a vehicle (not shown). In known differential housing assemblies, a drive shaft extends longitudinally through a centerline of the vehicle and connects to a ring gear attached to the differential housing 2. As the drive shaft rotates the ring gear, the differential housing 2 rotates and, in turn, the pinion shaft 22a rotates. The rotating pinion shaft 22a rotates the pinion gears 8 which engage the side gears 19 and drives the axles 40. Due to the arrangement of the differential housing 2, the pinion shaft 22a is orientated off-center with respect to the vehicle thus resulting in each axle shaft 40 having a different length.

Axle shafts 40 of different lengths are undesirable as each axle shaft 40 must be manufactured separately. In addition, each axle shaft 40 must be machined to precisely the length required for engagement with the respective side gears 8. Further, each axle shaft 40 must be sorted and assembled on the corresponding side of the vehicle. Moreover, if each axle shaft 40 is of a different length, then each axle shaft 40 will experience a different amount of torque or "wind up". Over time, the axle shafts 40 may deform or otherwise be damaged by such unequal lengths and thus inherent different torque amounts. In addition, the operator of the vehicle may experience torque steer and/or squirm from the torque applied to unequal axle shaft lengths.

Accordingly, there is a need in the art for a differential housing capable of being offset from the centerline of the vehicle while being arranged to allow equal length axle shafts. Moreover, there is a need to provide a housing capable of supporting pinion shafts without the use of locking pins and associated manufacturing operations and components.

SUMMARY OF THE INVENTION

A differential housing assembly having a pinion shaft and a relieved portion formed therein is disclosed. The differential housing assembly is capable of utilizing axle shafts of equal length. Due to the offset orientation of the differential housing with respect to the vehicle, at least one of the axle shafts extends into the relieved portion. In addition, engagement between the axle shaft and the relieved portion prevents radial movement of the pinion shaft so as to eliminate the requirement of pinning the pinion shaft to the differential housing.

DESCRIPTION OF THE DRAWINGS

FIG. 3 is a cross-sectional view of a prior art differential housing having pinion shaft support holes there through.

DETAILED DESCRIPTION OF THE INVENTION

Figure 2:
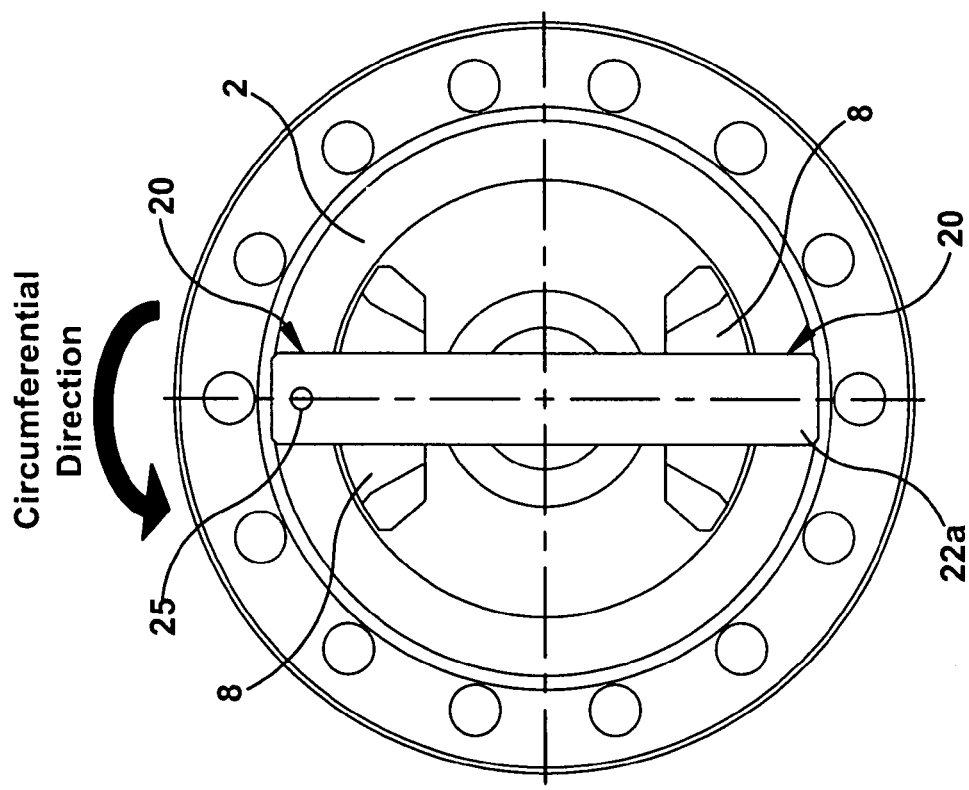
FIG. 2 is a cross-sectional view of the differential of FIG. 1 taken generally along line A-A.
Figure 1:
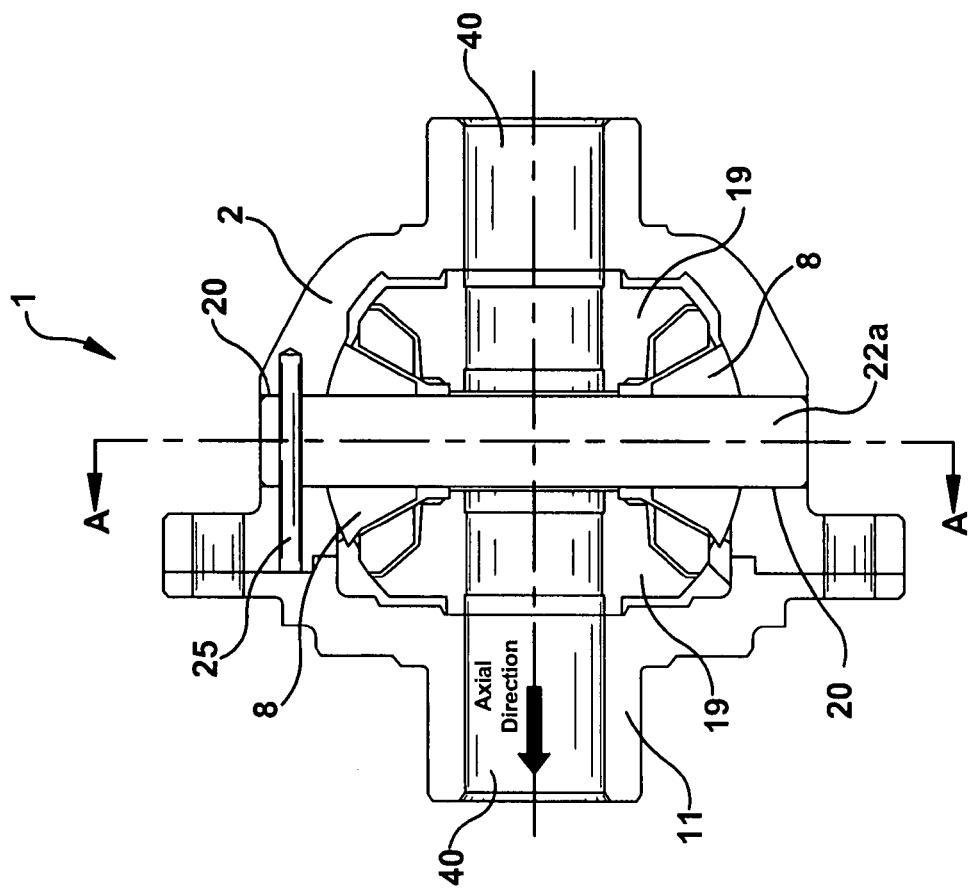
FIG. 1 is a cross-sectional view of a prior art differential with pinion shaft support holes therethrough.
Figure 3:
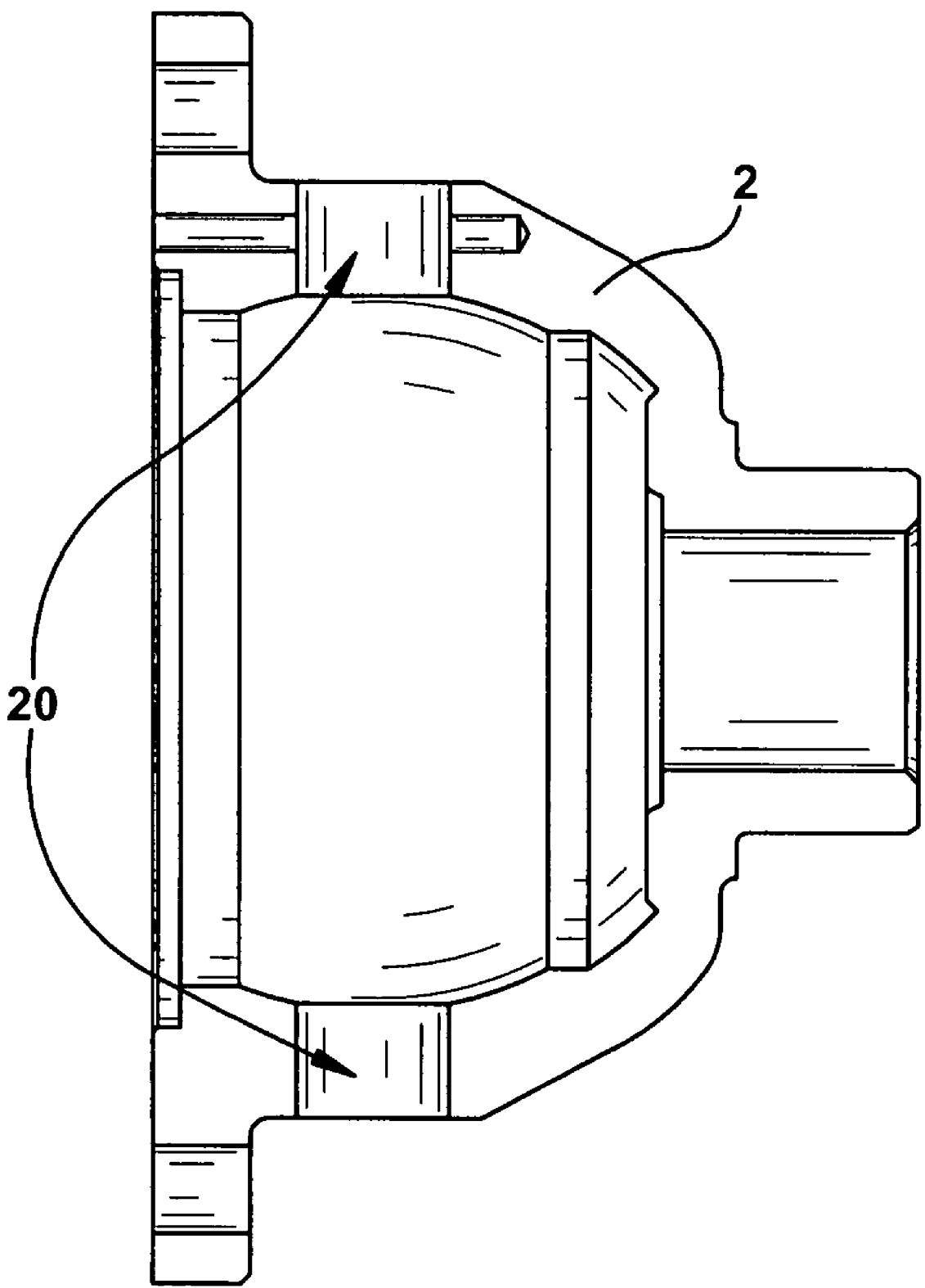
Figure 4:
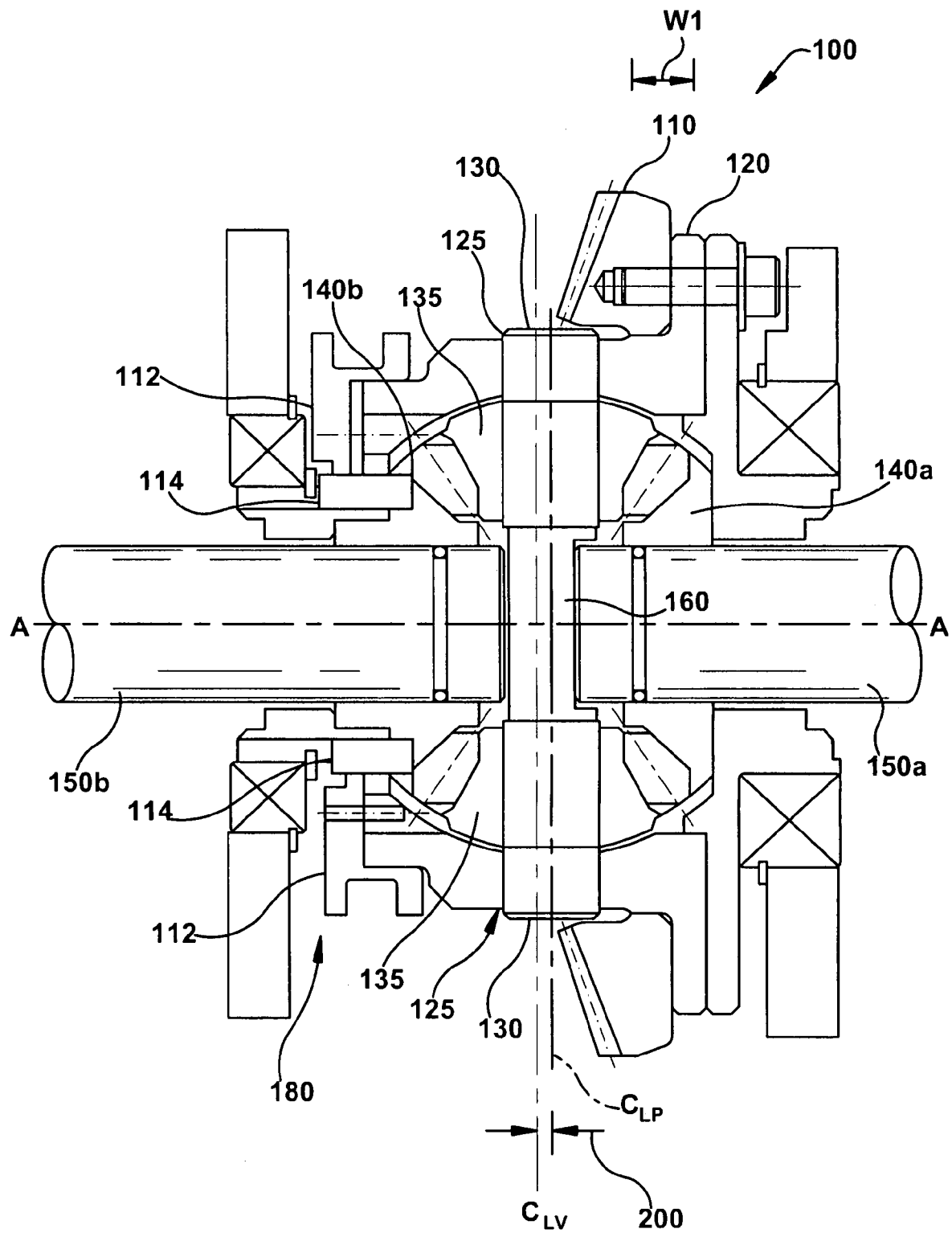
FIG. 4 is a cross-sectional view of an embodiment of a differential in accordance with the present invention.

Referring now to FIG. 4, an embodiment of the differential housing assembly 100 of the present invention is shown. The differential housing assembly 100 has a differential housing 120 and a ring gear 110 that may be coupled to and/or otherwise attached to a differential housing. 120. The ring gear 110 may be driven by a drive shaft (not shown) of, for example, a vehicle, such an ATV, an automobile or the like. The ring gear 110 may rotate the differential housing 120 about the axis A-A. Width W1 illustrates the width of the ring gear 110 in one embodiment of the present invention.

The differential housing assembly 100 may have a collar 112 that is engagable with the differential housing 120. The collar 112 may have a plurality of locking pins 114 extending into the differential housing 120. The locking pins 114 may extend through the differential housing 120 and side gear 140b. The collar 112 may be positioned such that movement, such as lateral movement, of the collar 112 may engage the locking pins 114 with the differential housing 120. For example, the collar 112 may be movable to position the locking pins 114 such that the locking pins 114 engage the side gear 140b and the differential housing 120. In an embodiment, the collar 112 may be movable from an engaged position to a disengaged position. At the engaged position, the collar 112 may position the locking pins 114 such that the side gear 140b is locked to the differential housing 120. At the disengaged position, the side gear 140b may be freely rotatable at different speeds.

The side gears 140a, 140b may be attached to, may be coupled to and/or may otherwise be secured to the axle shafts 150a, 150b. In an embodiment, the axle shafts 150a, 150b may be part of a vehicle, such as, an automobile, an off-road vehicle, an all-terrain vehicle or the like. The side gears 140a, 140b may be in meshing engagement with pinion gears 135. Engagement of the side gears 140a, 140b and the pinion gears 135 may drive the rotation of the axle shafts 150a, 150b.

The differential housing assembly 100 may have a pinion shaft 130 positioned within the differential housing 120. The pinion shaft 130 may be inserted into the differential housing 120 and may be coupled to the pinion gears 135. For example, the differential housing 120 may have apertures 125 for receiving the pinion shaft 130. The pinion shaft 130 may rotate with the differential housing 120 to transfer torque to the pinion gears 135. In turn, the pinion gears 135 may transfer torque to the side gears 140a, 140b that drive the corresponding axle shafts 150a, 150b. As a result, input torque may be converted through the pinion gears 135 and the side gears 140a, 140b such that the axle shafts 150a, 150b are permitted to rotate at different speeds.

Known differential housing assemblies require use of different axle shaft lengths. Advantageously, the differential assembly 100 is capable of incorporating axles shafts 150a, 150b having equal lengths. In such an embodiment, the present invention eliminates the requirement for producing two different axle shafts, sorting each axle shaft and properly assembling each axle shaft in its corresponding location. Each of the axles shafts 150a, 150b may be interchangeable with the other. Accordingly, the present invention provides a differential assembly 100 that can significantly reduce manufacturing and assembling costs.

Each of the axles shafts 150a, 150b may extend into the differential housing 120. In known differential housing assemblies, the axles shafts terminate within the side gears; however, the axles shafts 150a, 150b of the present invention extend through the side gears 140a, 140b. For example, as illustrated in FIG. 4, at least one of the axle shafts 150a, 150 may abut the pinion shaft 130.

The pinion shaft 130 may have a relieved portion 160. In one embodiment, the relieved portion 160 is sized so as to receive a portion of the axle shaft 150a and/or 150b. As illustrated in FIG. 4, the relieved portion 160 receives one end of an axle shaft 150a extending through a corresponding side gear 140a. In such an embodiment, the axle shaft 150a extends a greater distance into the differential housing 120 than the distance in which the shaft 150b extends into the differential housing 120.

As another advantage, the relieved portion 160 may receive at least one of the axle shafts 150a, 150b. Extending the axles shaft 150a, 150b into the relieved portion 160 provides structural support for the pinion shaft 130. For example, as illustrated in FIG. 4, the axle shaft 150a extends into the relieved portion 160 and may prevent longitudinal movement and/or rotational movement of the pinion shaft 130 with respect to a centerline $C_{LP}$ of the pinion shaft 130. In such an embodiment, the relieved portion 160 eliminates the need for conventional methods for securing the pinion shaft 130 to the differential housing 120, such as locking pins, cross pins, set screws, press fit, welding, etc. In addition, in one embodiment, the opposing axle shaft 150b may extend to the side of the pinion shaft 130 opposite the relieved portion 160 thereby further supporting the pinion shaft 130.

Eliminating the components associated with pinning the pinion shaft 130 to the housing 120 as well as the various accompanying machining processes required for manufacturing pins for the pinion shaft 130 significantly reduces assembly and manufacturing costs. In addition, eliminating the requirement for pinning the pinion shaft 130 also eases in assembly of the differential housing assembly 100.

The relived portion 160 may be a bore for receiving a portion of at least one of the axle shafts 150a, 150b. The relived portion 160 may have a height substantially equal to the diameter of the corresponding axle shaft 150, 150b so as to restrict rotational movement and/or longitudinal movement of the pinion shaft 130 with respect to the centerline $C_{LP}$ of the pinion shaft 130. The relieved portion 160 may be included in the pinion shaft 130 in an initial forming process, such as forging, or a subsequent material removal process, such as milling or broaching.

Dimensions of the relieved portion 160 may be determined based upon the requirements for supporting the pinion shaft 130 and/or as required to provide axles shafts 150a, 150b of equal length. In an embodiment where the axles shafts 150a, 150b have an equal length, a centerline of the vehicle $C_{LV}$ may be a horizontal plane extending through a midpoint of the axles shafts 150a, 150b. A centerline of the differential housing 120 is typically the same as the centerline of the pinion shaft $C_{LP}$. The centerline of the vehicle $C_{LV}$, however, may be required to be offset a distance 200 from the centerline of the pinion shaft $C_{LP}$ due to the structure of the differential housing assembly 100. For example, the offset 200 may be due to the orientation and structure of the ring gear 110, different bearing sizes, a locking mechanism 180 and/or the positioning of other parts of the vehicle. Due to the offset 200, the differential housing 120 may require that one of the axle shafts 150a, 150b extend further into the differential housing 120 in order to have substantially equal lengths.

In one embodiment, the length of the relieved portion 160 is substantially equivalent to the offset between the centerline of the vehicle and the center of the pinion shaft 130. For example, the distance from the centerline of the pinion shaft 130 to the centerline of the vehicle may be substantially equal to the depth and/or length of the relieved portion 160. As a result, the present invention provides the ability to compensate for the offset of the centerline of the pinion shaft 130 with respect to the centerline of the vehicle. In addition, the present invention allows such compensation to occur while providing axle shafts 150a, 150b of equal length.

In the embodiment as shown in FIG. 4, the width W1 of the ring gear 110 is substantially equal to the offset between the centerline of the pinion shaft and the centerline of the vehicle. Accordingly, the relieved portion 160 may, for example, compensate for the offset due to the width W1 of the ring gear 110. Of course, one of ordinary skill in the art will appreciate that other components causing offset may be present in differential housing assemblies and that, as a result, the present invention should not be deemed as limited to compensating for any specific type or amount of offset.

Alternatively, the pinion shaft 130 may have opposing relieved portions 160. The relieved portion 160 on the one side of the pinion shaft 130 is offset that may be compensated for by the relieved portion 160 at the opposing side of the pinion shaft 130. In such an embodiment, the length of the portion of the axle shaft 150a, 150b within the relieved portion 160 may be changed. For example, to increase the length of engagement between the axle shaft 150a and the relief portion 160, as shown in FIG. 4, offset may be introduced by extending the opposing shaft 150b into an opposing relief portion 160 (not shown). In such an embodiment, the length of each axle shaft 150, 150b may increase.

Therefore, the present invention provides a differential housing assembly 100 capable of utilizing equal axle shaft 150a, 150b length while eliminating the components and assembly required to pin the pinion shaft 130 to the differential housing 120. As a result, the present invention reduces manufacturing and assembly costs.

While the invention has been described with reference to the preferred embodiment, other modifications and design changes can be appreciated upon reading the disclosure along with the accompanying drawings while also falling within the scope of the invention as described and claimed. As such, nothing in the present description should be implied to limit the invention from what is claimed below.

Having thus described the invention, we claim:

1. A differential housing assembly comprising:
   a differential housing;
   a pinion shaft positioned within the differential housing; and
   a relief portion in the pinion shaft, the relief portion capable of receiving a portion of an axle shaft to restrict movement of the pinion shaft.

2. The differential housing assembly of claim 1 further comprising: a pair of equal length axle shafts extending into the differential housing, wherein one of the axle shafts engages the relief portion to restrict movement of the pinion shaft.

3. The differential housing assembly of claim 2 wherein the pinion shaft is secured to the differential housing without the use of locking pins.

4. The differential housing assembly of claim 2 further comprising: side gears attached to the axle shafts, the side gears located within the differential housing.

5. The differential housing assembly of claim 4 wherein each of the axle shafts extend through the side gears.

6. The differential housing assembly of claim 5 wherein at least one of the axle shafts abuts the pinion shaft.

7. The differential housing assembly of claim 5 wherein each axle shaft is interchangeable.

8. The differential housing assembly of claim 2 wherein the axle shafts are part of a vehicle having a centerline, and further wherein the centerline of the vehicle is located equidistant to each of the axle shafts.

9. A differential housing assembly comprising:
   a differential housing; and
   a pinion shaft positioned within the differential housing, the pinion shaft having a maximum thickness defined between a first side and a second side;
   a pair of axle shafts extending into the differential housing, wherein at least one of the axle shafts terminates within the first side and the second side of the pinion shaft.

10. The differential housing assembly of claim 9 wherein the differential housing assembly is incorporated onto a vehicle having a centerline that is offset with respect to a centerline of the pinion shaft.

11. The differential housing assembly of claim 10 further comprising: a relief portion in the pinion shaft for receiving a portion of at least one of the axle shafts.

12. The differential housing assembly of claim 11 wherein the relief portion extends toward the centerline of the pinion shaft a distance substantially equal to the offset.

13. The differential housing assembly of claim 10 wherein the axles shafts are equal length.

14. The differential housing assembly of claim 13 wherein at least one of the axle shafts prevents movement of the pinion shaft in a direction parallel to the centerline of the pinion shaft.

15. A differential housing assembly comprising:
   a differential housing;
   a pinion shaft positioned within the differential housing;
   a pair of axle shafts having equal length; and
   a relief portion in the pinion shaft for receiving at least a portion of one of the axle shafts.

16. The differential housing assembly of claim 15 wherein the portion of one of the axle shafts extends into the relief portion a first distance and the relief portion extends toward a centerline of the pinion shaft a second distance and further wherein the first distance and the second distance are substantially equal.

17. The differential housing assembly of claim 16 wherein the axle shafts are part of a vehicle having a centerline.

18. The differential housing assembly of claim 17 wherein the centerline of the vehicle is located a third distance from the centerline of the pinion shaft, and further wherein the third distance is substantially equal to the first distance and the second distance.

19. The differential housing assembly of claim 17 wherein the relief portion has a first recess on one side of the pinion shaft and a second recess on the opposing side of the pinion shaft.

20. The differential housing assembly of claim 17 further comprising: a ring gear attached to the housing wherein the ring gear offsets the centerline of the pinion shaft from the centerline of the vehicle.

* * * * *